United States Patent Office 2,974,436
Patented Mar. 14, 1961

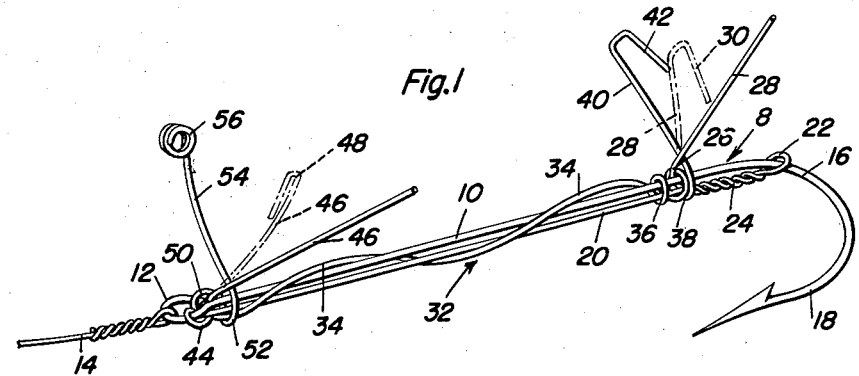
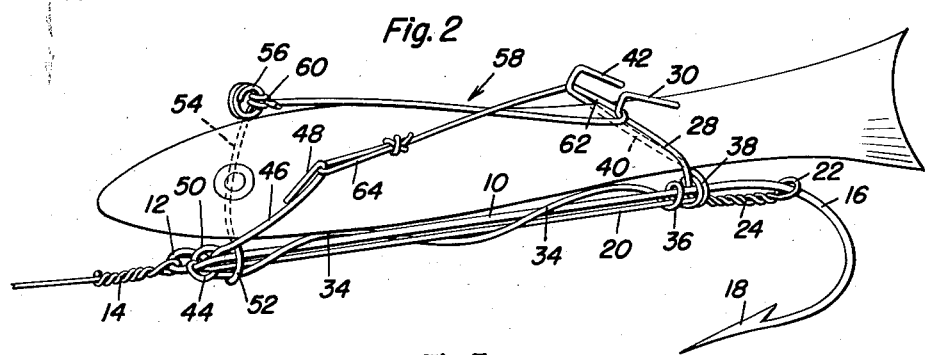
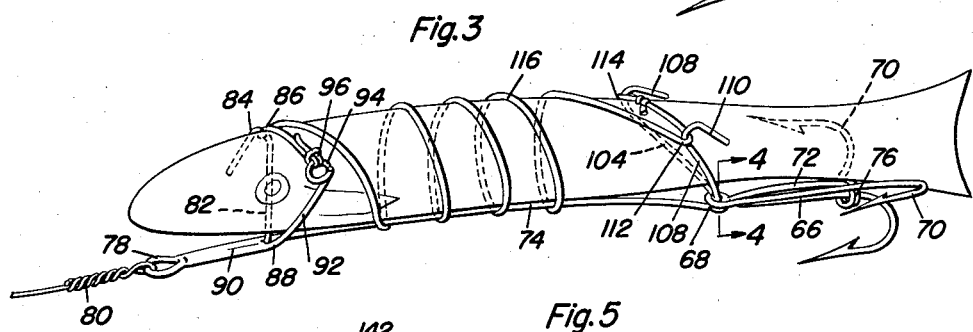
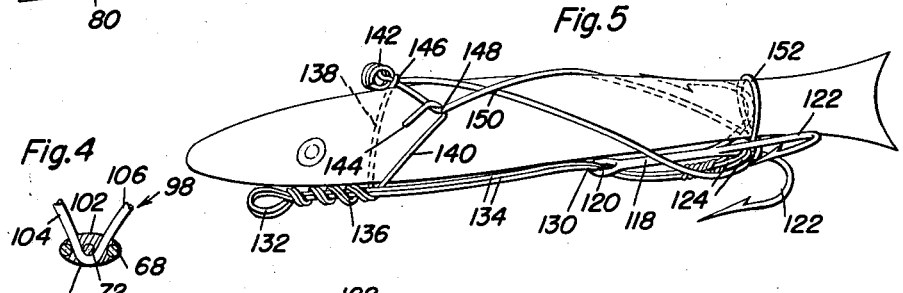
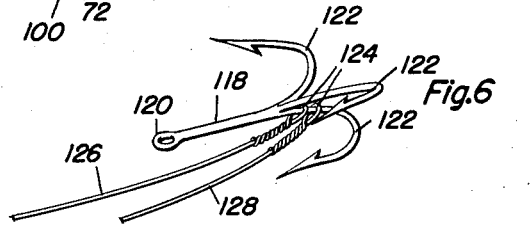
William E. Gourlay
INVENTOR.

2,974,436

LIVE BAIT HOLDER AND ELASTIC HARNESS

William E. Gourlay, Amenia Union, Wassaic, N.Y.

Filed Nov. 29, 1957, Ser. No. 699,726

2 Claims. (Cl. 43—44.4)

The present invention relates to a fishing device which functions as a holder for live bait and which has to do with a holder which is preferably constructed from wire, embodies means for hooking a fish and which is such in construction that it reliably harnesses the bait so that the bait can swim effectually.

An object of the invention is to provide a novel construction which is characterized by practical means wherein means is provided for saddling the bait, said means being also constructed and designed to permit the user to employ an ordinary rubber band as the elastic bait harnessing means.

As well be hereinafter evident the concept disclosed reveals several embodiments. Generically, the device comprises fish hooking means and a live bait holder constructed from bendable wire. This holder embodies at least one bait cradling saddle. The saddle is preferably V-shaped in end elevation and embodies a pair of outwardly diverging arms. As before touched upon, the harnessing means comprises an elastic band which when properly applied embraces and confines the live bait and yet allows the bait to swim and in this manner to successfully attract the fish to the hooking means.

One embodiment of the invention pertains to a holder fashioned from two pieces of wire which are cooperatively connected with a long shank fish hook and wherein the respective end portions of the two wires are fashioned into the arms which go to make up front and rear cradling saddles.

Another embodiment of the invention pertains primarily to a relatively short triple-prong fishhook wherein the saddle-equipped holder is constructed from cooperating wires which are peculiarly bent to provide a novel holder.

A third form of the invention also has to do with a triple-prong fishhook and wires which are bent and connected to provide a holder with a single V-shaped cradling saddle.

Other objects, features and advantages will become more readily apparent from the following description and the accompanying drawing.

In the drawing:

Fig. 1 is a perspective view of one embodiment of the invention showing the wires nearly, but not quite, completed.

Fig. 2 is a perspective view of the form of the invention seen in Fig. 1 with the parts complete and showing how the live bait is saddled and harnessed in readiness for use.

Fig. 3 is a view in perspective showing a second form or modification.

Fig. 4 is a section on the vertical line 4—4 of Fig. 3.

Fig. 5 is a view in perspective showing the third modification with the single V-shaped cradle.

Fig. 6 is a perspective view showing how ends of the cooperating wires are looped and connected with one of the prongs or hooks of the triple-prong fishhook.

With reference first to the form of the invention seen in Figs. 1 and 2, the fishhook 8 is conventional and the straight shank 10 thereof is shown provided at the front or forward end with a customary eye 12 to which the fishing line 14 is connected. The other end has a return-bend 16 formed into a barbed hook 18. As already mentioned two strands or pieces of wire of appropriate gauge are used in constructing the holder which is mounted on the shank 10. One wire has a substantially straight major or reach portion 20 and this is approximately parallel and commensurate in length with the shank 10. The right hand end (seen in Figs. 1 and 2) extends to the return-bend where it is formed into an attaching loop 22 and is then returned to the left and twisted at 24 and then bent around the reach 20 at 26 to provide an extension which is formed into one of the diverging arms 28 of the rear V-shaped cradle. As seen in Fig. 2 the free end portion of the arm is bent to provide a harness accommodating hook 30. The other wire has its major or reach portion 32 bent helically at 34 around the reach 20 and shank 10. The rear end portion of the last named wire is coiled at 36 and 38 and then bends at an oblique angle toward the left to form an extension which in turn provides the left hand arm 40 of the V-shaped saddle. Here again the free end of the arm is bent into a hook 42. The left hand end of the strand or first wire 20 is extended through the eye 12 and is coiled at 44 and is then fashioned into an oblique angled extension which forms one of the arms 46 of the front saddle. The free end of this wire is formed into a hook 48. The cooperating end portion of the second wire is also passed through the eye and bent as at 50 and again at 52 and is directed toward the left in Fig. 1 where it forms the second diverging arm 54 of the front saddle. The free end of this is formed into an eye 56. Thus longitudinally spaced front and rear V-shaped cradling saddles are formed from the two strands of wire connected together and with the shank of the hook, that is, the shank 10. The harness comprises an elastic band 58 having one end attached at 60 to the eye 56, having its intermediate portion 62 releasably connected with the hooks 42 and 30 and having its free end formed into a loop 64 connected with the remaining hook 48.

In the form of the invention seen in Figs. 3 and 4, the shank 66 of the triple-prong hook has an eye 68 at one end and barbed hooks 70 at the other end. An end portion 72 of a single strand 74 passes through and beyond the eye 68 to the right where its terminal 76 is coiled around one of the hooks. The other end of this wire is formed into an eye 78 designated as a line eye to accommodate the line 80 and by way of a return-bend this is formed into an arm 82 with a terminal hook 84 for a cooperating portion 86 of the elastic harness. There is a shank 88 welded in place at 90 and this is bent to provide the other arm 92 of the front saddle and this terminates in an eye 94 to which the elastic element is connected at 96. As seen in Fig. 4 the V-shaped saddle at the rear is denoted by the numeral 98 and this is a separate V-shaped element which has its crotch 100 located in the eye 68 and soldered in place at 102. The divergent arms 104 and 106 are bent at their free ends to provide terminal hooks 108 and 110 for the portions 112 and 114 of the elastic harnessing band. The intermediate portion of the band at 116 is wrapped around the bait to hold it in the two saddles.

The hook seen in the form of the invention in Figs. 5 and 6 comprises a shank 118 with an eye 120 and barbed hooks 122. The looped ends 124 of the wires 126 and 128 are attached to one of the hooks. The two wires 126 and 128 extending side by side at 130 pass forwardly through the eye 120 where they are bent upon themselves at 132 to provide a line eye. The reach portion of the wires in this instance is denoted at 134. The end portions of the two wires are twisted or coiled around the reach inwardly or to the left of the eye 32 as at 136 and the free ends are then bent into divergent relationship by the left hand arm 138 and the right hand arm 140 of the front V-shaped saddle. Here one arm is provided with an eye 142 and the other one with a hook 144. One end 146 of the rubber band or elastic harnessing element is connected to the eye 142 and the adjacent portion 148 is engaged with the hook 144. Portions of the band are then crossed over each other at 150 and the looped portion is carried around the tail portion of the live bait at 152.

Although the manner of inter-relating the wires to make up the holder appears complicated, the fact remains that, in effect, there is simply provided a bait holder which is fashioned from wires assembled in one of several ways and which in each instance provide at least one V-shaped saddle as seen for example in Fig. 5. In the other forms of the invention Figs. 1 to 4 inclusive, two V-shaped saddles are provided. In these forms the arms of the front and rear saddles incline toward each other. Also in these forms of the invention one arm of the front V-shaped saddle has an eye for attaching the elastic element thereto and the other arms have properly positioned hooks by way of which the elastic element is easily put in position to stay. The elasticity has been found ample to hold the live bait cradled in the respective saddles thus giving the bait freedom to swim.

Minor changes in shape, size, materials and rearrangement of parts may be resorted to in actual practice without departing from the spirit of the invention or the scope of the invention as claimed.

What is claimed as new is as follows:

1. For use by a fisherman, a live bait harnessing and holding device comprising a bait holder having fish hook means and constructed from wire and also having a pair of longitudinally spaced V-shaped bait cradling saddles, one saddle being located at the front end of the holder and the other saddle at the rear end portion of said holder, each saddle having a pair of substantially rigid upwardly and outwardly diverging arms providing a V-shaped cradle between themselves, the upper ends of the arms being spaced apart to permit a portion of a bait to be seated in the saddle or moved bodily therefrom with expediency, one arm of the front saddle having a terminal eye and the companion arm of said saddle having a terminal hook, said arms being inclined rearwardly toward the fish hook means, the arms of the rear saddle being inclined forwardly and having terminal hooks, and an elastic bait embracing and harnessing band one end of which is fastened to said terminal eye and the other portions of the band being releasably connectible with the respective hooks on the arms of the saddles which are provided with said terminal hooks.

2. A fishing device comprising a fishhook having a shank with an eye at the leading end of the shank and hook means at the trailing end, a single length of substantially rigid elongated wire having a rear end portion joined with the eye portion of the fishhook shank and a major portion constituting a reach member and extending forwardly from said eye and provided at its leading end with a line attaching eye, a front V-shaped bait cradling saddle having an apical portion joined to the forward end portion of said reach member rearwardly of the line eye, and a rear V-shaped bait saddling member having its apical portion integrated with the rear end portion of the reach member, said V-shaped bait cradling saddles being directed upwardly from the reach member and being disposed at oblique angles in respect to the longitudinal axis of said reach member, said rear saddle having substantially straight diverging arms directed toward the front V-shaped cradling saddle and terminating in outwardly and downwardly directed harness accommodating and retaining hooks, and said front saddle also having diverging arms directed toward the arms of the rear saddle, one arm of said front saddle having a free end portion provided with a terminal eye and the other arm of said front saddle being provided with a down-bent hook, and a flexible bait harnessing element having one end attached to the terminal eye on the aforementioned one arm of the front saddle and complemental portions thereof separably connectible with the several down-bent hooks provided therefor.

References Cited in the file of this patent

UNITED STATES PATENTS

| | | |
|---|---|---|
| 797,161 | West | Aug. 15, 1905 |
| 1,114,698 | Lane | Oct. 20, 1914 |
| 1,558,476 | Gruenhagen | Oct. 27, 1925 |
| 2,402,730 | Bucks | June 25, 1946 |
| 2,598,011 | Pitre | May 27, 1952 |